United States Patent [19]

Take et al.

[11] Patent Number: 5,269,140
[45] Date of Patent: Dec. 14, 1993

[54] EXHAUST GAS PURIFIER FOR METHANOL-FUELED ENGINES

[75] Inventors: Shigeo Take, Kanagawa; Masaji Kurosawa, Chiba, both of Japan

[73] Assignee: Nichias Corporation, Tokyo, Japan

[21] Appl. No.: 602,956

[22] Filed: Oct. 24, 1990

[30] Foreign Application Priority Data

Oct. 24, 1989 [JP] Japan .................. 1-274823

[51] Int. Cl.$^5$ .................. F01N 3/18; B01D 53/02
[52] U.S. Cl. .................. 60/274; 55/DIG. 30; 60/297; 60/311; 422/171; 423/213.7; 95/141; 96/134; 96/153
[58] Field of Search .................. 60/274, 297, 311; 423/213.7; 55/466, DIG. 30, 74, 75; 422/171; 502/79, 87

[56] References Cited

U.S. PATENT DOCUMENTS 3,757,521 9/1973 Tourtellotte .................. 60/297
4,985,210 1/1991 Minami .................. 413/213.7

FOREIGN PATENT DOCUMENTS 1205980 6/1986 Canada .................. 60/297
189309 2/1986 Japan .................. 60/297

*Primary Examiner*—Douglas Hart
*Attorney, Agent, or Firm*—Cushman, Darby & Cushman

[57] ABSTRACT

An adsorber comprising zeolite retained on structure of substantially inorganic fibers disposed in the exhaust gas stream of an engine. The invention has particular application to purification of exhaust gas streams of methanol fueled engines in combination with catalytic means for decomposing undesired organic matter from the exhaust gas stream. The adsorber adsorbs organic matter from the exhaust gas at relatively low exhaust gas temperatures at which the catalyst is of reduced effectiveness, and desorbs organic matter at elevated temperatures at which the catalyst is of heightened effectiveness.

14 Claims, 6 Drawing Sheets

EXHAUST GAS PURIFIER FOR METHANOL-FUELED ENGINES

BACKGROUND OF THE INVENTION

1. Field Description of the Invention

The present invention relates to an exhaust-gas purifier for use in methanol-fueled diesel engines.

2. Description of Related Art

A methanol-fueled diesel engine ejects exhaust-gas containing organic substances such as formaldehyde/methanol and the like which are generated by incomplete combustion. Among those organic substances, particularly unfavorable is formaldehyde; it not only smells bad, but also is harmful to human health. Accordingly, direct discharge thereof into open air should be avoided. In the prior art, measures have been taken to decompose the objectionable organic substances including formaldehyde by oxidation prior to discharge using noble metals such as platinum, palladium, cobalt, nickel, and the like as catalysts. This method, however, requires heating the noble metal catalysts to high temperatures of 200° C. or above to bring the catalysts to a sufficiently activated state. Accordingly, the catalysts are of little or no effect in cases where the exhaust-gas temperature is lower than 100° C., such as in the idling period at the very starting of a cold engine. More disadvantageously, formaldehyde and incompletely combusted methanol are particularly heavily discharged at lower engine temperatures, such as at idling temperatures, with the result that the gas exhausted during the idling time is heavily polluted despite the treatment with the aforementioned catalysts.

With a view to solve the aforementioned problems inherent in the treatment with a catalyst, there are disclosed in Unexamined Published Utility Model Applications Sho-62-5820 and Sho-62-10223, arrangement designs comprising adsorbents set upstream of catalytic equipment so that the formaldehyde, methanol, and the like ejected at the engine start-up may be adsorbed until the catalyst comes to show its effect. As the temperature of the system increases, formaldehyde and the like, thus adsorbed on the adsorbents are desorbed but also with the increasing temperatures, the catalyst is sufficiently heated to readily decompose the organic substances. In this way it is possible to avoid direct discharge of an exhaust-gas of high pollution levels.

In the designs aforementioned, examples of the useful adsorbents disclosed include alumina, porous glass, active carbon, silica gel, and the like.

In exhaust-gas treatment apparatus using adsorbents in combination with catalysts, however, it is requisite that the adsorbents possess high retention capacity of the organic substances until the catalysts become sufficiently active, so that the organic substances including formaldehyde may not be ejected into the atmosphere. Larger adsorption capacity can be obtained, simply, by increasing the amount of the adsorbent, but there is always a restriction concerning the installation space for the adsorbent. It is preferred that the adsorbents occupy as small a space as possible. Accordingly, in the present invention it is preferred that the adsorbents be those having higher adsorption capacity per unit volume at low temperature at which the catalysts have no effect. It is further required that, at higher temperatures, the adsorbent gradually reduces its adsorption power and desorb the captured organic substances such as formaldehyde, so that the adsorbent may be used repeatedly in the next idling period.

It has been found that the adsorbents of the prior art exhaust-gas purifiers were deficient in these regards. Notably, an object of the present invention is to provide a more compact adsorbent and an improved purification of the exhaust-gas during the engine idling period.

Another object of the present invention is to provide an adsorbent more efficient in its adsorption-desorption characteristics on components of a methanol-fueled engine exhaust-gas, and to further provide a high-performance exhaust-gas purifier using the same adsorbent.

SUMMARY OF THE INVENTION

The present invention comprises an apparatus and method for purifying exhaust gas from methanol-fueled engines. A zeolite adsorbent, preferably disposed on a honeycomb inorganic fiber structure, is used to adsorb organic matter from the exhaust gas when the exhaust gas is at less than optimum catalyst operational temperatures. Such lower temperatures frequently occur upon start up of a cold engine or during periods of idling. When exhaust gas temperatures in the system rise, such as during engine workload operations, the adsorbed organic matter is desorbed from the adsorbent and passed to the catalyst which, with the higher gas temperatures, functions more efficiently to decompose the undesirable organic matter of the gas. It has also been found that at start up of the engine, water vapor adsorbed by the adsorbent increases the efficiency of the desired methanol and formaldehyde adsorption by the adsorbent.

DESCRIPTION OF THE PREFERRED EMBODIMENT

Figure 1:
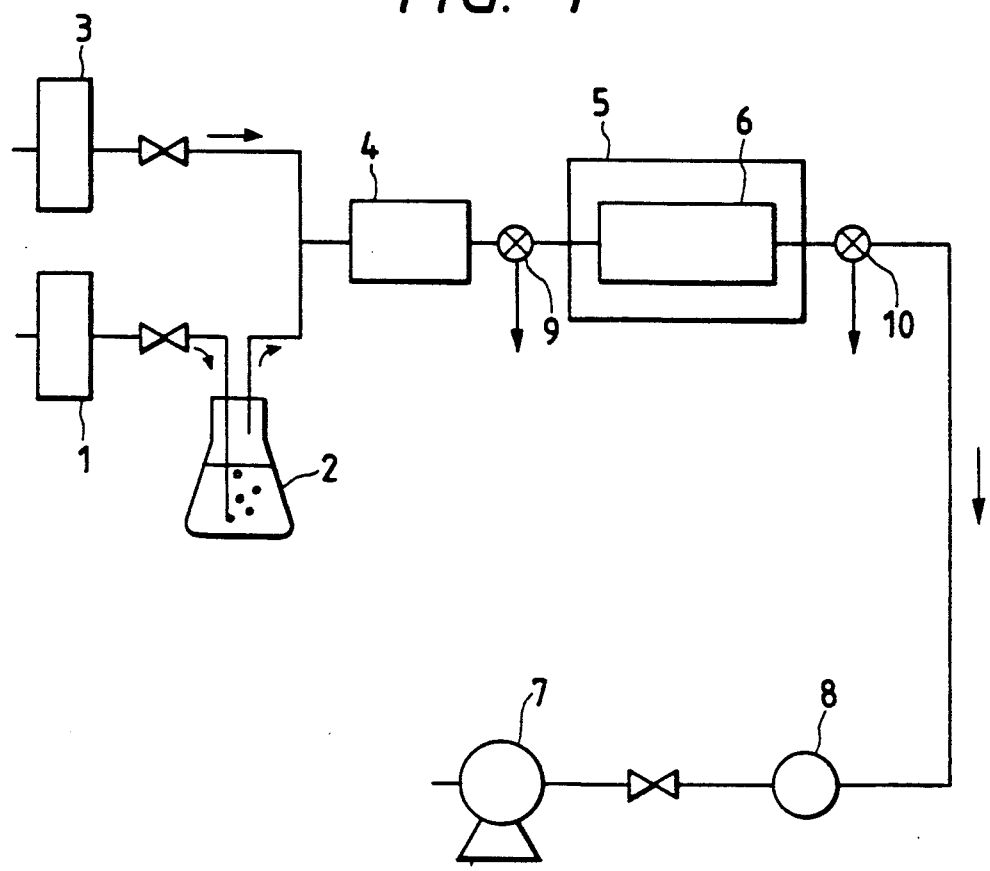
FIG. 1 is a schematic overview of the experimental set-up of Tests 1 and 2 described herein in the evaluation of adsorption capacity of the adsorbents according to the present invention.

The exhaust-gas purifier according to the below described preferred embodiment of the present invention for use in methanol-fueled engines comprises synthetic zeolite as an adsorbent, carried on an inorganic-fibre based honeycomb structure.

Synthetic zeolites used herein are crystalline hydrated metal aluminosilicates which are, in particular, adsorbents comprising pores functioning as molecular sieves. Accordingly, zeolites have been widely used in the field of chemical engineering and the like for separation and purification of various materials. However, it is believed that the present invention is the first case in which they are used for the treatment of exhaust-gas ejected from methanol-fueled engines. Furthermore, the adsorption-desorption characteristics for formaldehyde and methanol has never been recognized to present.

Synthetic zeolites are commercially available from Union-Showa Co. Ltd., Mobil Oil Co. Ltd., and the like, in a variety according to adsorption characteristics ascribed to the difference in chemical composition, pore diameters, and other attributes. Common products, Molecular Sieve 4A or Molecular Sieve 13X, both manufactured by Union-Showa Co. Ltd., preferably can be used in the exhaust-gas purifier of the present invention, but other zeolites also may be used without particular restriction.

Suitable for use in the present invention are synthetic zeolites, but particularly preferred among them are those highly capable of adsorbing water vapor at the heated state (more specifically, having a saturated adsorption at 100° C. of at least 5 g of $H_2O$ per 100 g of zeolite under a water vapor partial pressure of 10 mmHg) for the advantage of providing excellent adsorption capacity of formaldehyde and methanol from exhaust-gas ejected from methanol-fueled engines. Such zeolites moreover, have temperature characteristics of adsorption-desorption which are suitable for achieving the objects of the present invention.

An inorganic-fibre based honeycomb structure is employed in the present invention to carry thereon granules or pellets of the zeolite, because a can body filled up with such zeolites alone (without the honeycomb structure) would result in too high a ventilation resistance, with a consequent undesirable increase in engine load.

In mutually related U.S. Pat. Nos. 4,595,403 and 4,650,621 to Sago et al., incorporated herein by reference, are disclosed a latent heat exchanger element employing an inorganic-fiber based honeycomb structure carrying thereon a synthetic zeolite. This element can be readily applied for use in the exhaust-gas purifier of the present invention.

The honeycomb structure carrying thereon synthetic zeolites for use in the purifier according to the present invention can be manufactured according to the process disclosed in the aforementioned Sago patents. More specifically, the process comprises: preparing a waterproof bulky paper (about 0.15 to 1.0 mm in dry thickness with density of about 0.2 to 0.4 g/cm$^3$) from a fiber mixture comprising mainly ceramic fibers and additional organic fibers, using an organic binder; impregnating the paper with a dispersion of fine-grained synthetic zeolite; processing the paper into a desired shape; impregnating the paper with colloidal silica or ethyl silicate and transforming the silicon compounds into silica gel; and firing the paper to remove the organic matter therefrom.

The ceramic fibers for use in the process above include the so-called heat-resistant inorganic fibers such as silica fibers, alumina fibers, aluminosilicate fibers, and zirconia fibers, known commercially by the tradename of, for example, Fineflex (a product of NICHLAS Corp.), Refrasil (a product of HITCO Co. Ltd.), and the like. Also mentioned are silica glass fibers, E-glass fibers, and the like.

Preferred as the synthetic zeolites to be carried on the paper by impregnation are those comprising fine particles, preferably those approximately 5.5 μm in average diameter and substantially free from particles 10 μm or larger in diameter, although larger or smaller particles may be used. The paper is then impregnated with the dispersant, preferably at a coverage of from about 100 to 200 g/m$^2$ as solid synthetic zeolite.

A honeycomb structure carrying thereon a synthetic zeolite manufactured according to the process above is commercially available as a heat exchanger element, termed "Honeycle", from NICHIAS Corp. The "Honeycle" can be applied to use in the present invention.

The honeycomb-structure carrying thereon a synthetic zeolite is then fixed in the upper stream of the exhaust-purifier in such a manner that the axis of the channels in the honeycomb structure are approximately in the flow direction of the exhaust-gas.

Figure 6:
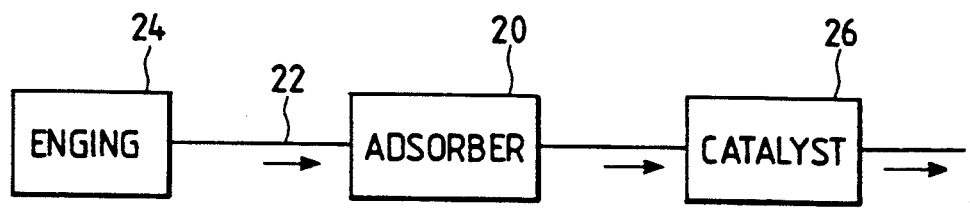
FIG. 6 is a schematic view of the purifier of the present invention connected to an engine.

FIG. 6 shows a schematic view of an adsorbent (20) operatively connected to receive the exhaust gas stream (22) of an engine (24) according to the present invention. Also operatively connected, downstream of the adsorbent (20), is a catalyst (26) which receives exhaust gas from the adsorbent (20) and serves to decompose undesired organic matter of the exhaust gas.

There is no particular restriction in the present invention concerning the catalyst which functions at the oxidation-decomposition, and any catalyst may be used in combination with the aforementioned adsorbent as far as it becomes active before the temperature reaches the high 200° C. range. There is also no restriction in the mode of fitting the catalyst to the purifier.

The invention is described in further detail referring to the Example and Tests below.

EXAMPLE 1

Figure 7:
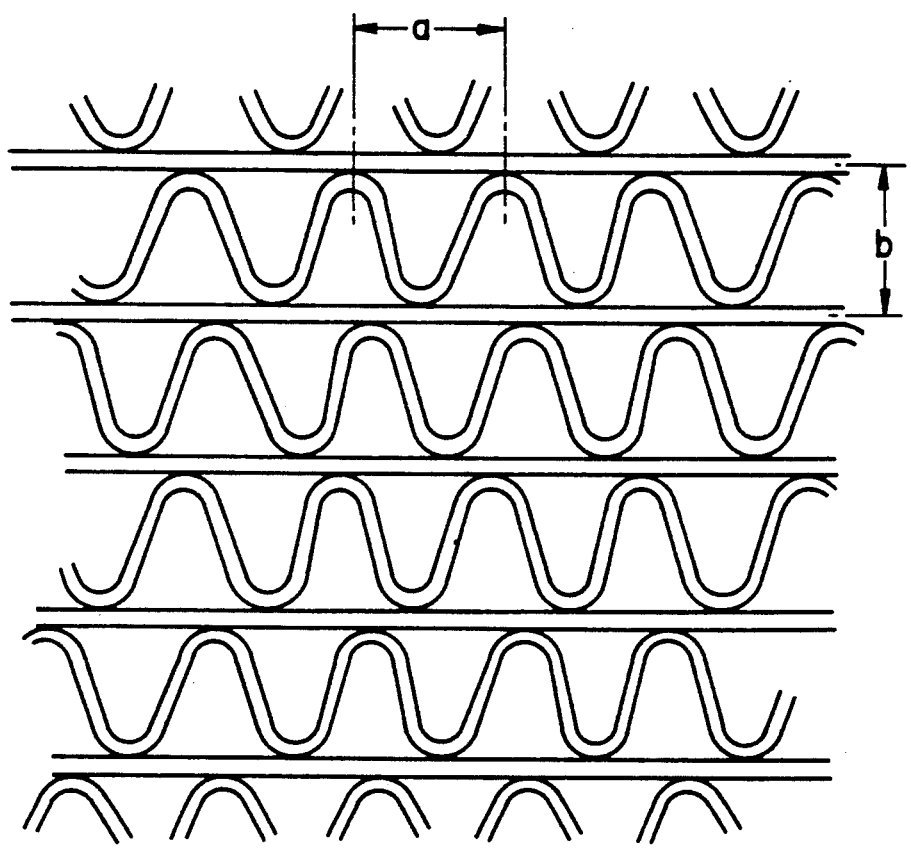
FIG. 7 is an example of a honeycomb structure; where, a: a pitch length and b: a height.

A 0.2 mm thick paper 90% in porosity was prepared from an alumina-silica based ceramic fiber (Fineflex, manufactured by NICHIAS Corp.) according to the process disclosed in the Sago patents. The resulting porous paper was impregnated with a water dispersion comprising fine-grained synthetic zeolite powder, and was then processed into a corrugated paper using a corrugated fiberboard processing machine. This corrugated fiberboard was superposed on a plane paper board, and the resulting laminate was coiled into a cylinder to give a honeycomb structure. The honeycomb structure was then fixed with Snowtex (an inorganic binder manufactured by Nissan Chemical Industries, Ltd.). Final firing at 400° C. burned off organic matters to give a honeycomb-structured adsorbent 2.1 mm in height b and 0.3 g/cm$^3$ in density, corrugated at a pitch a length of 4.1 mm, and carrying zeolite per unit volume (cm$^3$) of 0.16 g (see FIG. 7).

Figure 4:
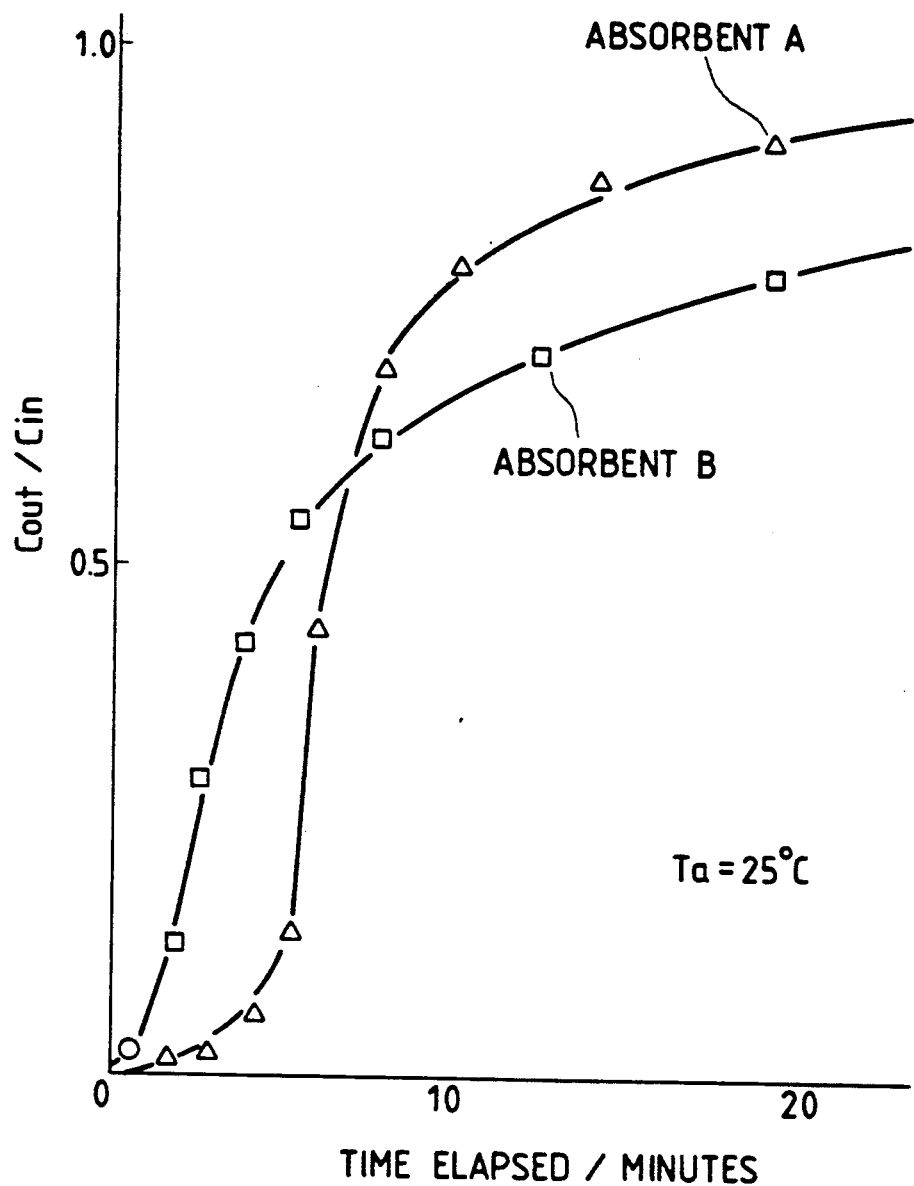
FIG. 4 is a chart showing adsorption capacity plotted versus elapsed time for a test of adsorbents A and B (described herein) made according to the present invention.

An example of such honeycomb structure is shown in FIG. 4 of the Sago patents which shows a cross-sectional view perpendicular to the axis of the gas flow passages of the structure. It should be noted that FIG. 4 of the Sago patents, however, shows the corrugated/plane paper board laminate arranged in parallel rows rather than coiled into a cylinder.

Two types of adsorbents, A and B, were each manufactured following the process described above, using respectively the synthetic zeolites below.

Adsorbent A: Molecular Sieve 13× (manufactured by Union-Showa Co. Ltd.); and

Adsorbent B: Y-type Zeolite (SiO$_2$ rich type, low water adsorption capacity, manufactured by Mobil Oil Co. Ltd.).

The adsorbents were each fixed in a cylindrical purifier casing and in combination with a decomposition catalyst (fixed in a monolith-shaped carrier). The adsorbent and the catalyst were positioned in a serial arrangement with the catalyst being set at the downstream side of the adsorbent.

Test 1

Each of the purifiers thus assembled was installed in a methanol-fueled engine to test its efficiency. The exhaust-gas ejected by way of the purifier A maintained a low formaldehyde concentration level, showing no substantial difference in concentration between the gas exhausted during idling and that exhausted in high-speed rotation of 3000 rpm. In the case of using purifier B, the concentration of formaldehyde in the exhaust-gas tended to slightly increase at the final state of idling, however, it was also concluded that the purifier had useful effect in removing formaldehyde from the exhaust-gas.

TEST 2

The adsorbent A manufactured in Example 1 above was subjected to a test to examine its methanol adsorption characteristics, using a methanol-air mixture prepared as a model gas for the gas exhausted from a methanol-fueled engine. Methanol was used in this case for its ease in handling as compared with formaldehyde. It was verified, however, in a preliminary experiment that the adsorption characteristics of a synthetic zeolite for methanol are not dissimilar from those for formaldehyde.

FIG. 1 is a schematic of the experimental set-up for Test 2. The methanol-air gas mixture was produced by blowing clean air passed through the air-cleaner (1) into methanol charged in the flask (2), and was then mixed with a clean air passed through a separate air-cleaner (3) to control the methanol concentration of the gas mixture. The gas mixture, after preheating with a pre-heater (4), was brought into contact with the adsorbent (6) (36 mm in diameter and 50 mm in length) provided in a heating bath (5) the temperature of which was adjusted to be the same as that of the gas mixture. The gas was withdrawn by suction using the pump (7), and the flow rate thereof is measured with the flowmeter (8).

The gas was collected at the entrance (9) and at the outlet (10) of the adsorbent (6) to measure the methanol content by means of gas chromatography, and the adsorption characteristics were evaluated from the change in the methanol concentration ratio, $C_{out}/C_{in}/$ wherein $C_{out}$ represents the methanol concentration at the outlet (10) of the adsorbent (6), and $C_{in}$ represents that at the entrance (9) of the adsorbent (6).

(a) Temperature Characteristics of Adsorption

Adsorption capacity was measured changing the gas temperature, Ta, in the range of from 16° C. to 200° C., while maintaining constant the $C_{in}$ to 5% and SV to 2400/hour, where SV is the surface velocity given as follow:

$$SV = \frac{\text{flow rate of processing air (m}^3/\text{hr)}}{\text{volume of composite zeolite volume (m}^3)}$$

Figure 2:
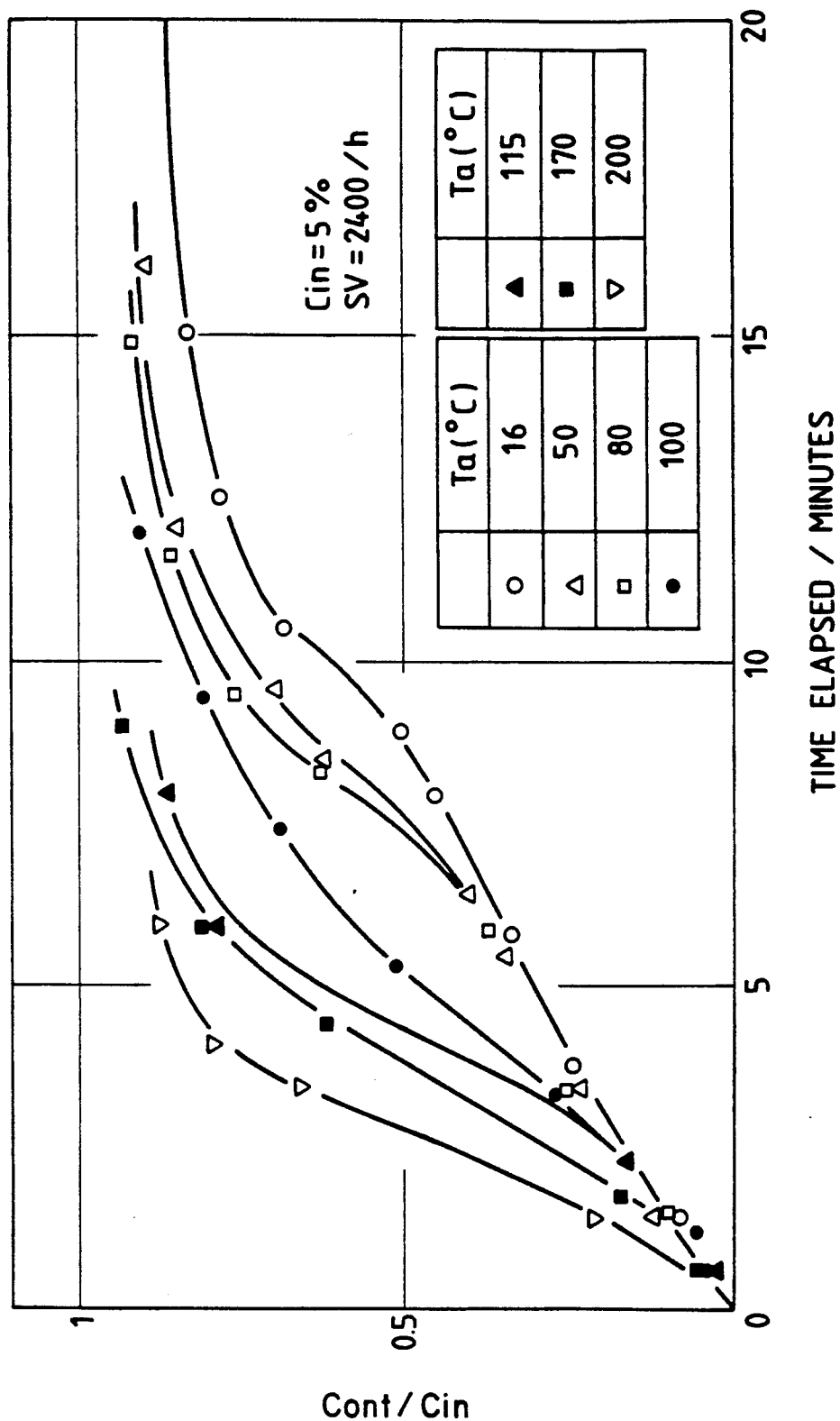
FIG. 2 is a chart showing adsorption capacity plotted versus elapsed time for Test 1 described herein.

The results are shown in FIG. 2.

FIG. 2 shows that in any temperature tested there is a general trend of increasing $C_{out}/C_{in}$ with the passage of time and of decreasing adsorption rate with increase in the amount adsorbed. It is noted, however, that the rise in $C_{out}/C_{in}$ is faster for higher Ta, indicating loss in adsorption power. This loss of adsorption power becomes more pronounced in the temperature range of from about 100° C. to 200° C. This signifies that the methanol adsorbed at 100° C. or lower gradually is released during temperature rise from around 100° C. to 200° C.

(b) Influence of Water on the Adsorption Characteristics

Three adsorbents, namely, an adsorbent dried at 150° C. just before subjecting to the test; an adsorbent provided with zeolitic water (containing approximately 0.16 g/cm³ of zeolitic water); an adsorbent left in open air for a long time in the same condition as those tested in other tests (water content: about 25% by weight), were each tested for adsorption capacity at 15° C.

Figure 3:
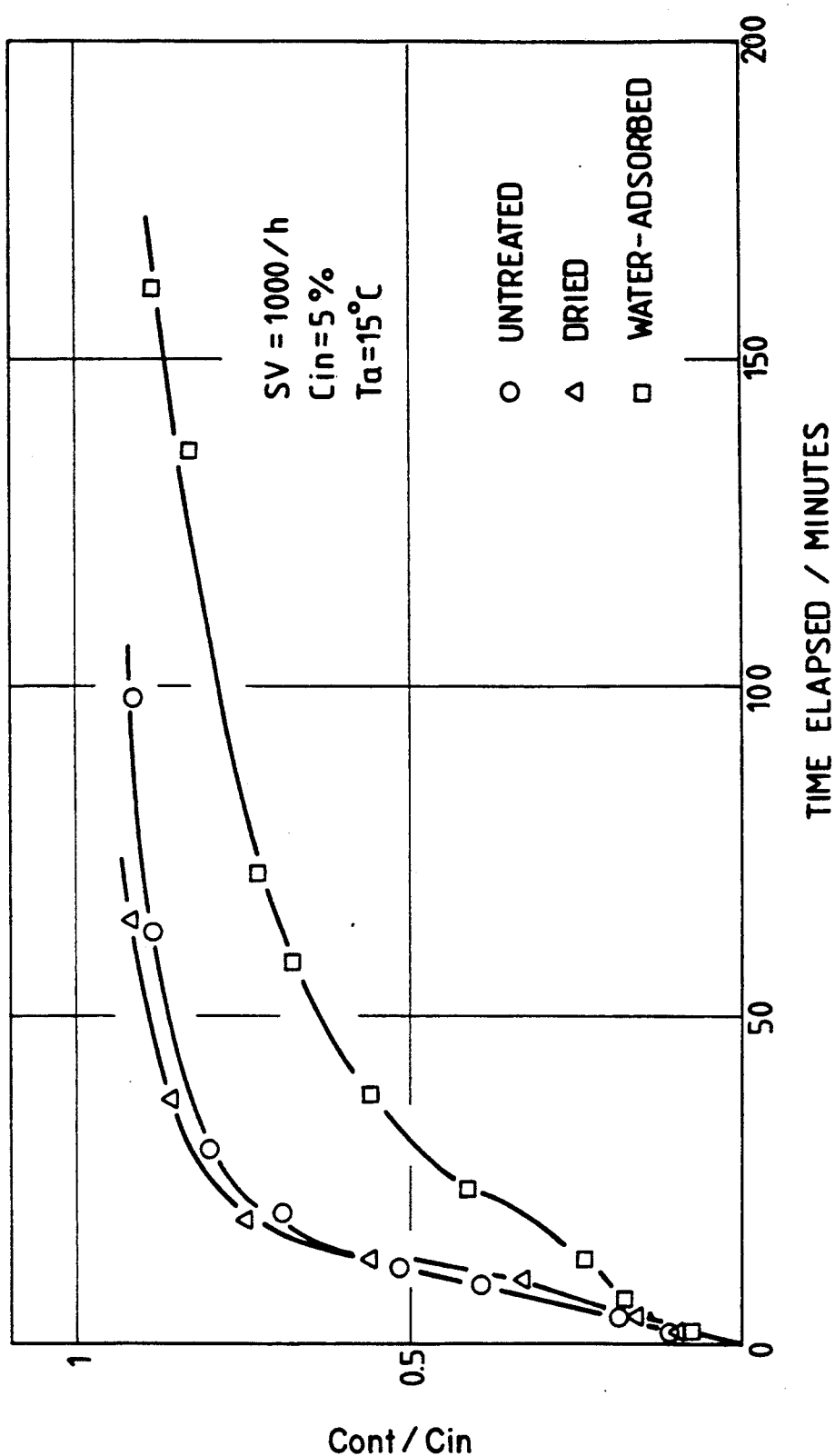
FIG. 3 is a chart showing adsorption capacity plotted versus elapsed time as affected by water content of an adsorbent according to the present invention.

The $C_{in}$ and SV were maintained at 5% and 1000/hour, respectively, in the tests. The results are given in FIG. 3.

The adsorbent having the zeolitic water was the highest in adsorption capacity. This may be attributed to a hydration reaction of the zeolitic water with methanol.

From these results it can be seen that the synthetic zeolites high in water-adsorption capacity show particularly favorable properties for use in the exhaust-gas purifiers as temporary adsorbents for organic matters such as formaldehyde. While not wishing to be bound by the present theory, it is speculated that such zeolites at the early stage of the idling of an engine become wet by the condensation-adhesion or adsorption of the water vapor supplied from the exhaust-gas, and are thereby rendered highly efficient in the adsorption capacity of methanol and formaldehyde. This moisturizing effect, then, disappears with completion of the water desorption by 200° C., which is favorable in the present invention.

TEST 3

Figure 5:
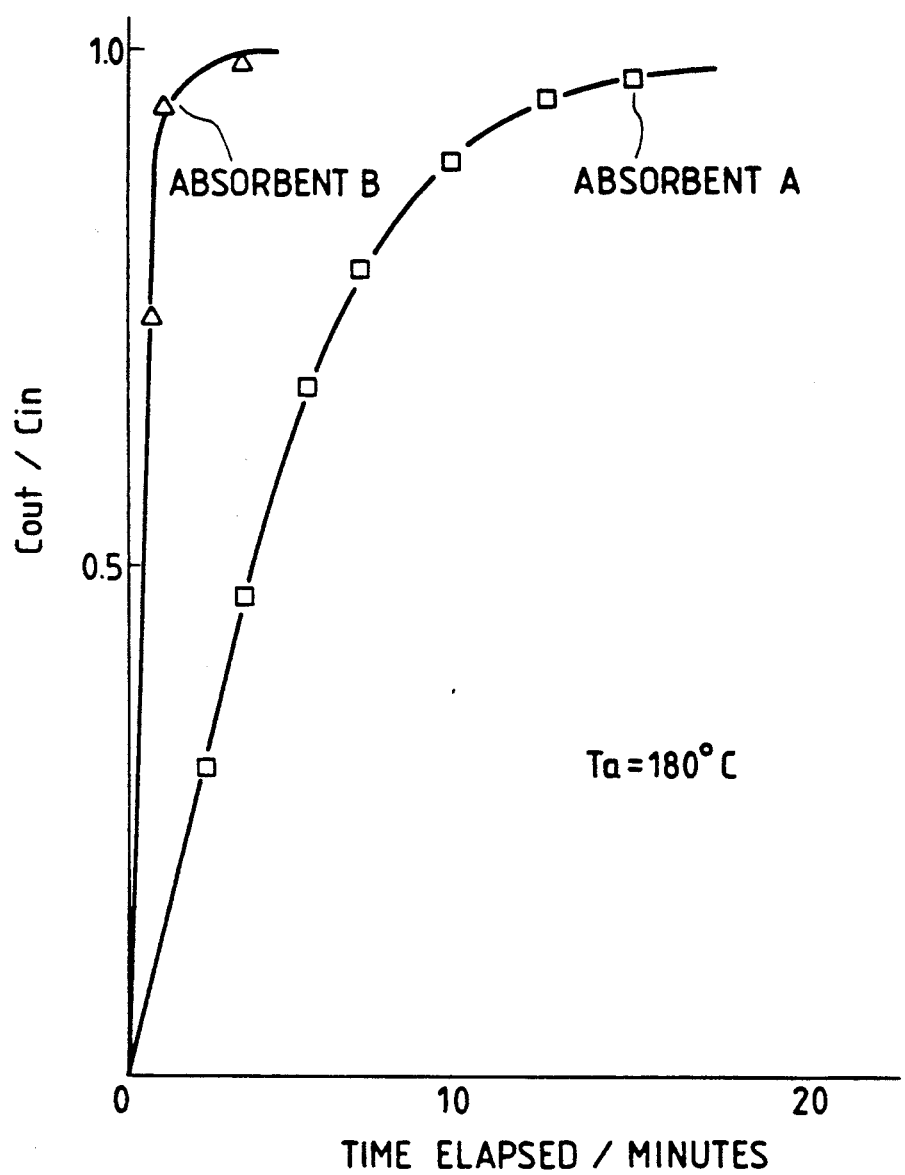
FIG. 5 is a chart showing adsorption capacity plotted versus elapsed time for a test of adsorbents A and B (described herein) made according to the present invention.

Adsorbent B was subjected to tests similar to those carried out in Test 2 to evaluate adsorption characteristics at 25° C. and 180° C. Adsorbent A was subjected to the same tests for comparison. The $C_{in}$ was maintained at 5%. The results are shown in FIGS. 4 and 5. Adsorbent B was superior to Adsorbent A in the initial adsorption rate at 25° C., however, the saturation adsorption was not so high as in Adsorbent A. Further, the test at 180° C. revealed that Adsorbent B quickly lost adsorption power and that the desorption occurred at a lower temperature as compared with the case of Adsorbent A.

The exhaust-gas purifier according to the present invention comprises an adsorbent installed at the upper stream side of a catalyst. Since the adsorbent, composed of an inorganic-fiber based honeycomb structure carrying thereon a synthetic zeolite, has advantageous characteristics as set forth above, it is possible to effectively purify a gas exhausted from methanol-fueled engines at a low pressure loss and with a compact means, even in the case of treating low temperature gas exhausted during the idling of the engine.

A variety of means known to those skilled in the art can be used to enclose the adsorbent and position it in exhaust gas communication with the engine and the catalyst. The adsorbent can be enclosed in a separate and/or replaceable container, enclosed in the exhaust gas line of the engine, or otherwise disposed to receive the exhaust gas from the engine. The adsorbent should be positioned upstream of the catalyst.

The honeycomb structure is designed to provide a plurality of approximately parallel flow channels to the exhaust gas which maximizes exposure of the gas to the zeolite on the structure while reducing, as possible, resistance introduced on the flow of the gas by the honeycomb structure. It is not necessary that the individual flow channels have a particular cross-sectional configuration.

Although the invention has been described with application to methanol fueled diesel engines, it will be understood that it also has application to other types of engines fueled by methanol and also to engines fueled by other fuel types as well.

Having described the invention, it will be apparent to those skilled in the art that various modifications may be made thereto without departing from the spirit and scope of this invention as defined in the appended claims.

What is claimed is:

1. An exhaust-gas purifier for a methanol fueled engine comprising:
   an X-type zeolite adsorbent which adsorbs organic matter from the exhaust-gas ejected from the methanol-fueled engine; and
   a catalyst which decomposes said organic matter, the adsorbent comprising X-type zeolite impregnated into a honeycomb structure made of synthetic fibers.

2. The exhaust-gas purifier of claim 1, wherein the X-type zeolite adsorbent has a water saturated adsorption at 100° C. of at least 5 g of $H_2O$ per 100 g of zeolite under a water vapor partial pressure of 10 mm Hg.

3. An exhaust gas purifier for a methanol fueled engine comprising:
   an X-type zeolite adsorbent for adsorbing organic matter from exhaust gas ejected from the methanol-fueled engine; and
   enclosing means for communicating exhaust gas to the X-type zeolite adsorbent, wherein the X-type zeolite adsorbent comprises X-type zeolite impregnated into a honeycomb structure of synthetic fibers.

4. The purifier of claim 3, further comprising a catalyst which receives exhaust gas from said adsorbent and which serves to decompose organic matter of said exhaust gas.

5. The purifier of claim 3, wherein the X-type zeolite adsorbent has a water saturated adsorption at 100° C. of at least 5 g of $H_2O$ per 100 g of zeolite under a water vapor partial pressure of 10 mm Hg.

6. The purifier of claim 4, wherein said X-type zeolite is disposed on said structure in a density of about 100 to 200 grams of zeolite per square meter of structure exposed to the exhaust gas.

7. A methanol engine exhaust gas treating apparatus, comprising:
   an X-type zeolite containing structure for adsorbing organic matter from said exhaust gas, said X-type zeolite containing structure being disposed to receive engine exhaust gas, and
   a catalytic converter for decomposing organic matter from said exhaust gas, said catalytic converter being disposed to receive exhaust gas after the exhaust gas has been exposed to the X-type zeolite containing structure;
   wherein said X-type zeolite containing structure comprises X-type zeolite impregnated into a honeycomb structure made of synthetic fibers.

8. The engine exhaust gas treating apparatus of claim 7, wherein said X-type zeolite containing structure comprises about 100 to 200 grams of zeolite per square meter of surface area of X-type zeolite containing structure exposed to receive said engine exhaust gas.

9. A method of treating exhaust gas of a methanol-fueled engine, comprising the steps of:
   exposing the exhaust gas to an X-type zeolite adsorbent impregnated into a honeycomb structure made of synthetic fibers to adsorb organic matter from the exhaust gas; and
   after exposing the exhaust gas to the X-type zeolite adsorbent, exposing the exhaust gas to a catalyst to decompose organic matter in the exhaust gas,
   the X-type zeolite adsorbent tending to adsorb organic matter at relatively lower engine exhaust operating temperatures and tending to desorb previously adsorbed organic matter at relatively higher engine exhaust operating temperatures.

10. The method of claim 9 wherein the X-type zeolite adsorbent is disposed on a structure of primarily inorganic fibers.

11. The method of claim 9 wherein the X-type zeolite adsorbent has a water saturated adsorption at 100° C. of at least 5 g of $H_2O$ per 100 g of zeolite under a water vapor partial pressure of 10 mm Hg.

12. A process for purifying methanol engine exhaust gas comprising the steps of:
   exposing said gas to an X-type zeolite impregnated into a honeycomb structure of synthetic fibers, and
   then exposing said gas to a catalyst for decomposing organic compounds in said gas.

13. A method of treating exhaust gas from a methanol-fueled engine by passing it through:
   a first container having an exhaust gas flowpath and containing an X-type zeolite having a water saturated adsorption at 100° C. of at least about 5 g of water per 100 g of zeolite under a water vapor partial pressure of 10 mm Hg disposed in the exhaust gas flowpath of the first container such that the X-type zeolite is impregnated into a honeycomb structure of synthetic fibers,
   the first container connected to a second container such that exhaust exiting the first container passes into the second container,
   the second container having an exhaust gas flowpath therein and having a catalyst disposed in the exhaust gas flowpath of the second container which decomposes organic matter in the exhaust gas.

14. A controlled emissions power unit comprising:
   a methanol-fueled engine and an exhaust gas system, the exhaust gas system comprising:
   a first chamber connected to the methanol-fueled engine to receive exhaust gas from the methanol-fueled engine and having therein an X-type zeolite having a water saturated adsorption at 100° C. of at least about 5 g of water per 100 g of zeolite under a water vapor partial pressure of 10 mm Hg, the zeolite disposed so as to contact exhaust gas received from the methanol-fueled engine such that the X-type zeolite is impregnated into a honeycomb structure of synthetic fibers, and
   a second chamber connected to receive exhaust gas from the first chamber and having therein a catalyst to enhance decomposition of organic matter in the exhaust gas, the catalyst disposed so as to contact exhaust gas received from the first chamber.

* * * * *